2 Sheets—Sheet 1.

J. KIMBALL.

MACHINES FOR SHAPING HEEL-STIFFENERS FOR BOOTS AND SHOES.

No. 7,708. Reissued May 29, 1877.

J. E. Knop

Bernard Davis

John Kimball
by J. E. Maynadier
his atty.

N. PETERS, PHOTO-LITHOGRAPHER, WASHINGTON, D. C.

J. KIMBALL.

MACHINES FOR SHAPING HEEL-STIFFENERS FOR BOOTS AND SHOES.

No. 7,708. Reissued May 29, 1877.

J. E. Krus
Bernard Davis

John Kimball
by J. E. Maynadier
Atty.

N. PETERS. PHOTO-LITHOGRAPHER, WASHINGTON, D. C.

UNITED STATES PATENT OFFICE.

JOHN KIMBALL, OF BOSTON, MASSACHUSETTS.

IMPROVEMENT IN MACHINES FOR SHAPING HEEL-STIFFENERS FOR BOOTS AND SHOES.

Specification forming part of Letters Patent No. 131,957, dated October 8, 1872; reissue No. 7,708, dated May 29, 1877; application filed March 11, 1874.

*To all whom it may concern:*

Figure 5:
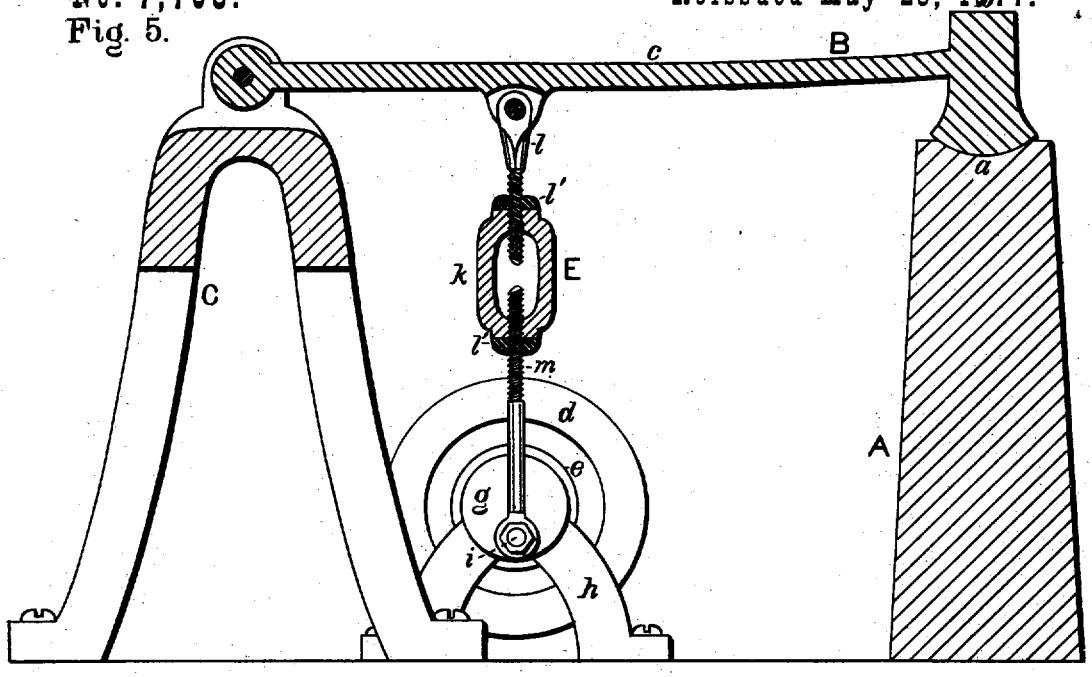
Figure 1:
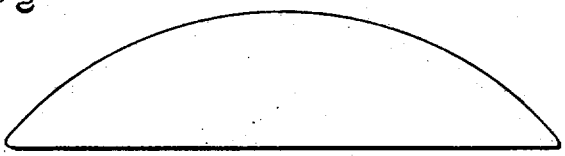
Figure 2:
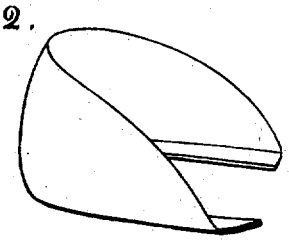
Figure 3:
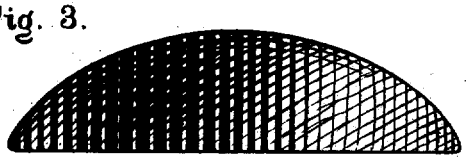
Figure 4:
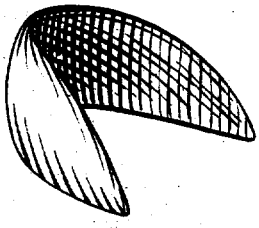
Figure 6:
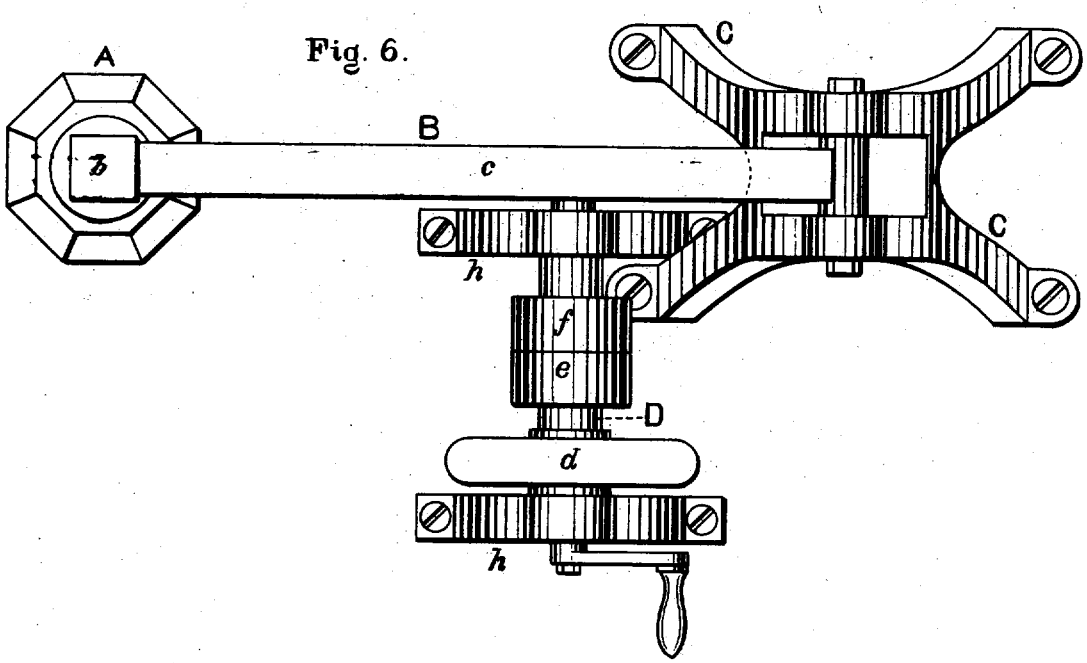
Figure 7:
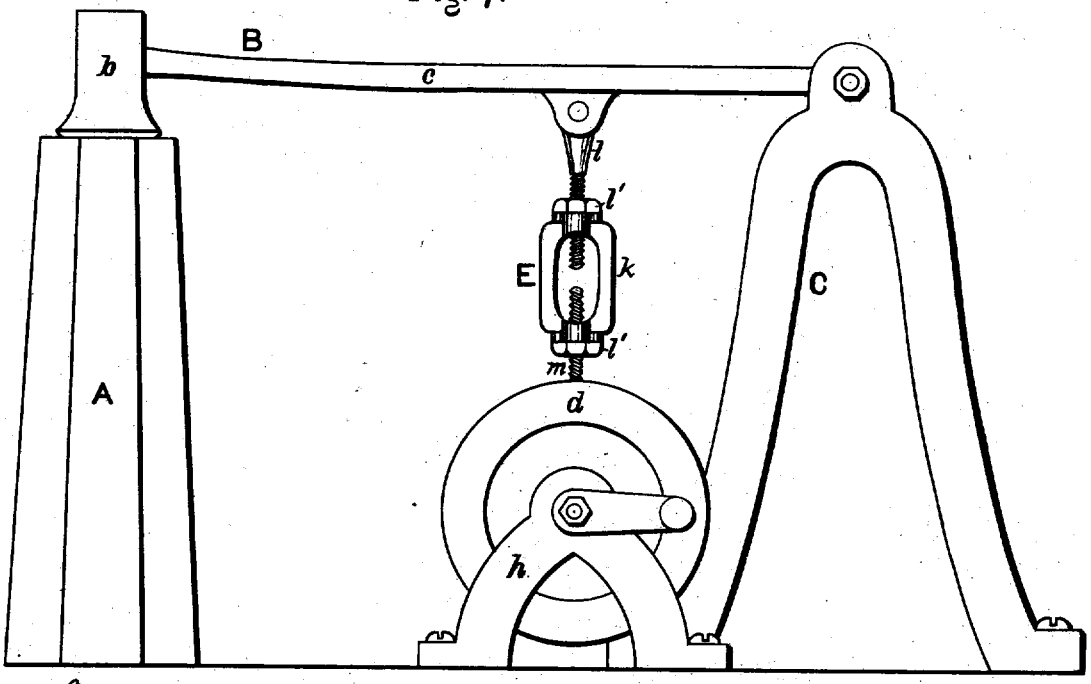

Be it known that I, JOHN KIMBALL, of Boston, Suffolk county, Massachusetts, have invented certain Improvements in the Manufacture of Stiffenings or Counters for Boots and Shoes, of which the following is a specification:

Heel-stiffeners or counters are manufactured ordinarily of leather or leather board, and large numbers of them are merely flat pieces died out and skived (see Fig. 1;) but of late years many have been made and sold by forming these flat pieces, as shown in Fig. 2, by means of a male and female die.

Both these forms are objectionable, the first because the labor of fitting the stiffener to the curves of the heel of the last must be performed by the laster; and the second because of the difficulty of properly inserting the stiffener between the lining and upper, on account of the angle formed.

The object of my invention is to provide a stiffener free from both these objections; and the first part of my invention consists in a stiffener formed, as to its outline, in the usual way, and properly skived, but made convex inside and concave outside. This stiffening is as easily inserted between the lining and the upper as the flat stiffener or stiffener-blank shown in Fig. 1, but can be fitted much more readily and accurately to the heel of the last than that stiffening. The time spent in applying my stiffening is much less than that necessary in applying either of the stiffenings shown in Fig. 1 or Fig. 2, while it fits better than either.

The best method known to me (when I applied for my original patent) of making these stiffenings was to die them out and skive them, and then pass the flat blanks between a concave anvil and a convex hammer. This not only gives them the shape desired, but condenses, and thereby improves them, especially when of leather or similar substance.

In the drawings I have shown a simple and efficient machine for practicing this method of shaping and condensing the stiffeners.

A is a post, having a concavity, *a*, in its head to receive a hammer, B, the face of whose head *b* is correspondingly convex. The shank *c* of the hammer is pivoted at its end to a standard, C, and said shank should not be too rigid.

Below the hammer-shank is a driving-shaft, D, provided with a fly-wheel, *d*, a driving or fast pulley, *e*, a loose pulley, *f*, and a cranked wheel, *g*, the shaft being supported by suitable standards *h h*. The crank-pin *i* of the wheel is connected with the hammer-shank by an adjustable connecting-rod, E, composed of a coupling, *k*, and two rods, *l m*. One rod is pivoted to the shank and the other to the crank-pin, and there is a right screw on one rod and a left screw on the other, in order that when the coupling is revolved in one direction it shall lengthen the connecting-rod, and when turned the opposite way shorten it. Upon each screw is a set-nut, *l'*, to prevent the coupling from being revolved accidentally.

The connecting-rod is adjustable to accommodate stiffeners differing in thickness, and the hammer-shank elastic to accommodate the varying thickness of any stiffener, which is generally much thicker at its middle than at its edges.

On putting the driving-shaft in revolution, a reciprocating movement will be imparted to the hammer, and if a stiffener-blank be interposed between the two and moved longitudinally and laterally, as may be required, it may be condensed and beaten into shape with great advantage.

I do not claim the process of hammering heel-stiffeners by means of a convex-faced hammer, for I am aware that the same is among the oldest of known means employed for that purpose; nor do I claim any process now known of consolidating or forming such stiffeners by hand, as my process differs materially therefrom, for, as practiced by me, the direction of the blow and the points of impact of the hammer and anvil upon the stiffener are fixed and unvarying, and, therefore, unlike, in their effects, that of hand-hammering; and for the preceding reasons a sharper line of curve of both hammer and anvil may be employed than when manipulated by hand, and the result or product of my process is a stiffener more uniform in density, of better contour of lines, and better adapted to a high grade of work than any ever produced either by hand manipulation, or by simple pressure, without percussive force, in a mold.

What I claim as my invention is—

1. The method of consolidating and forming heel-stiffeners, in a concave anvil, by the impact of a series of blows of a convex-faced hammer automatically delivered in an unvarying direction relatively to such anvil and stiffener, substantially as described and shown.

2. The heel-stiffener machine, substantially as described and represented, and for the purpose specified, and consisting of the cranked shaft D, connecting-rod E, the helve or shank *c*, convex-faced hammer *b*, and the anvil or post A with its concavity *a*, all combined, arranged, and constructed with a support or frame, C, and provided with suitable pulley, as set forth and shown.

JOHN KIMBALL.

Witnesses:
J. E. MAYNADIER,
J. E. KNOX.